(12) United States Patent
Matsuda et al.

(10) Patent No.: US 7,792,359 B2
(45) Date of Patent: *Sep. 7, 2010

(54) METHODS AND SYSTEMS FOR DETECTING REGIONS IN DIGITAL IMAGES

(75) Inventors: Toyohisa Matsuda, Matsudo (JP); Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/424,281

(22) Filed: Jun. 15, 2006

(65) Prior Publication Data

US 2007/0206856 A1    Sep. 6, 2007

Related U.S. Application Data

(63) Continuation-in-part of application No. 11/367,244, filed on Mar. 2, 2006.

(51) Int. Cl.
   *G06K 9/00* (2006.01)
(52) U.S. Cl. .................................... 382/168; 382/176
(58) Field of Classification Search .................. 382/176, 382/118, 110; 378/98; 358/462
   See application file for complete search history.

(56) References Cited

U.S. PATENT DOCUMENTS

| 4,414,635 | A | 11/1983 | Gast et al. |
|---|---|---|---|
| 4,741,046 | A | 4/1988 | Matsunawa et al. |
| 5,001,767 | A | 3/1991 | Yoneda et al. |
| 5,034,988 | A | 7/1991 | Fujiwara |
| 5,157,740 | A | 10/1992 | Klein et al. |
| 5,280,367 | A | 1/1994 | Zuniga |
| 5,293,430 | A | 3/1994 | Shiau et al. |
| 5,339,172 | A | 8/1994 | Robinson |
| 5,353,132 | A | 10/1994 | Katsuma |
| 5,379,130 | A | 1/1995 | Wang et al. |
| 5,481,622 | A | 1/1996 | Gerhardt et al. |
| 5,546,474 | A | 8/1996 | Zuniga |
| 5,581,667 | A | 12/1996 | Bloomberg |
| 5,588,072 | A | 12/1996 | Wang |
| 5,642,137 | A | 6/1997 | Kitazumi |
| 5,649,025 | A | 7/1997 | Revankar |
| 5,682,249 | A | 10/1997 | Harrington et al. |
| 5,689,575 | A | 11/1997 | Sako et al. |

(Continued)

FOREIGN PATENT DOCUMENTS

JP    07-107275 A    4/1995

(Continued)

OTHER PUBLICATIONS

Duong et al, "Extraction of text area in preinted document images", Nov. 2001, DocEng'01, Atlanta, GA, USA, pp. 157-164.*

(Continued)

*Primary Examiner*—Samir A. Ahmed
*Assistant Examiner*—Ruiping Li
(74) *Attorney, Agent, or Firm*—Kristine E. Matthews; David C. Ripma

(57) ABSTRACT

Embodiments of the present invention comprise systems, methods and devices for detection of image regions using a masking condition and an entropy measure.

20 Claims, 13 Drawing Sheets

U.S. PATENT DOCUMENTS

| | | | |
|---|---|---|---|
| 5,694,228 | A | 12/1997 | Peairs et al. |
| 5,696,842 | A | 12/1997 | Shirasawa et al. |
| 5,767,978 | A | 6/1998 | Revankar et al. |
| 5,768,403 | A | 6/1998 | Suzuki et al. |
| 5,778,092 | A | 7/1998 | MacLeod et al. |
| 5,809,167 | A | 9/1998 | Al-Hussein |
| 5,848,185 | A | 12/1998 | Koga et al. |
| 5,854,853 | A | 12/1998 | Wang |
| 5,867,277 | A | 2/1999 | Melen et al. |
| 5,900,953 | A | 5/1999 | Bottou et al. |
| 5,903,363 | A | 5/1999 | Yaguchi et al. |
| 5,923,775 | A | 7/1999 | Snyder et al. |
| 5,943,443 | A | 8/1999 | Itonori et al. |
| 5,946,420 | A | 8/1999 | Noh |
| 5,949,555 | A | 9/1999 | Sakai et al. |
| 5,956,468 | A | 9/1999 | Ancin |
| 5,987,171 | A | 11/1999 | Wang |
| 5,995,665 | A | 11/1999 | Maeda |
| 6,020,979 | A | 2/2000 | Zeck et al. |
| 6,084,984 | A | 7/2000 | Ishikawa |
| 6,175,427 | B1 | 1/2001 | Lehmbeck et al. |
| 6,175,650 | B1 | 1/2001 | Sindhu et al. |
| 6,178,260 | B1 | 1/2001 | Li et al. |
| 6,198,797 | B1 * | 3/2001 | Majima et al. ............ 378/98 |
| 6,215,904 | B1 | 4/2001 | Lavallee |
| 6,233,353 | B1 | 5/2001 | Danisewicz |
| 6,246,791 | B1 | 6/2001 | Kurzweil et al. |
| 6,256,413 | B1 | 7/2001 | Hirabayashi |
| 6,272,240 | B1 | 8/2001 | Li et al. |
| 6,298,173 | B1 | 10/2001 | Lopresti |
| 6,301,381 | B1 | 10/2001 | Hayashi |
| 6,308,179 | B1 | 10/2001 | Petersen et al. |
| 6,347,153 | B1 | 2/2002 | Triplett et al. |
| 6,360,009 | B2 | 3/2002 | Li et al. |
| 6,373,981 | B1 | 4/2002 | de Queiroz et al. |
| 6,389,164 | B2 | 5/2002 | Li et al. |
| 6,400,844 | B1 | 6/2002 | Fan et al. |
| 6,473,522 | B1 | 10/2002 | Lienhart et al. |
| 6,522,791 | B2 | 2/2003 | Nagarajan |
| 6,526,181 | B1 | 2/2003 | Smith et al. |
| 6,577,762 | B1 | 6/2003 | Seeger et al. |
| 6,594,401 | B1 | 7/2003 | Metcalfe et al. |
| 6,661,907 | B2 | 12/2003 | Ho et al. |
| 6,718,059 | B1 | 4/2004 | Uchida |
| 6,728,391 | B1 | 4/2004 | Wu et al. |
| 6,728,399 | B1 | 4/2004 | Doll |
| 6,731,789 | B1 | 5/2004 | Tojo |
| 6,731,800 | B1 | 5/2004 | Barthel et al. |
| 6,766,053 | B2 | 7/2004 | Fan et al. |
| 6,782,129 | B1 | 8/2004 | Li et al. |
| 6,901,164 | B2 | 5/2005 | Sheffer |
| 6,950,114 | B2 | 9/2005 | Honda et al. |
| 6,993,185 | B2 | 1/2006 | Guo et al. |
| 7,020,332 | B2 | 3/2006 | Nenonen et al. |
| 7,027,647 | B2 | 4/2006 | Mukherjee et al. |
| 7,062,099 | B2 | 6/2006 | Li et al. |
| 7,079,687 | B2 | 7/2006 | Guleryuz |
| 7,133,565 | B2 | 11/2006 | Toda et al. |
| 7,181,059 | B2 | 2/2007 | Duvdevani et al. |
| 7,190,409 | B2 | 3/2007 | Yamazaki et al. |
| 7,206,443 | B1 | 4/2007 | Duvdevani et al. |
| 7,483,484 | B2 | 1/2009 | Liu et al. |
| 7,518,755 | B2 | 4/2009 | Gotoh et al. |
| 2001/0050785 | A1 | 12/2001 | Yamazaki |
| 2002/0031268 | A1 | 3/2002 | Prabhakar et al. |
| 2002/0037100 | A1 | 3/2002 | Toda et al. |
| 2002/0064307 | A1 | 5/2002 | Koga et al. |
| 2002/0076103 | A1 | 6/2002 | Lin et al. |
| 2002/0110283 | A1 | 8/2002 | Fan et al. |
| 2002/0168105 | A1 | 11/2002 | Li |
| 2003/0086127 | A1 * | 5/2003 | Ito et al. ............ 358/462 |
| 2003/0107753 | A1 | 6/2003 | Sakamoto |
| 2003/0133612 | A1 | 7/2003 | Fan |
| 2003/0133617 | A1 | 7/2003 | Mukherjee |
| 2003/0156760 | A1 | 8/2003 | Navon et al. |
| 2004/0001624 | A1 | 1/2004 | Curry et al. |
| 2004/0001634 | A1 | 1/2004 | Mehrotra |
| 2004/0042659 | A1 * | 3/2004 | Guo et al. ............ 382/176 |
| 2004/0083916 | A1 | 5/2004 | Isshiki |
| 2004/0096102 | A1 | 5/2004 | Handley |
| 2004/0179742 | A1 | 9/2004 | Li |
| 2004/0190027 | A1 | 9/2004 | Foster et al. |
| 2004/0190028 | A1 | 9/2004 | Foster et al. |
| 2004/0205568 | A1 | 10/2004 | Breuel et al. |
| 2004/0240733 | A1 | 12/2004 | Hobson et al. |
| 2005/0008221 | A1 | 1/2005 | Hull et al. |
| 2005/0100219 | A1 | 5/2005 | Berkner et al. |
| 2005/0129310 | A1 | 6/2005 | Herley |
| 2005/0163374 | A1 | 7/2005 | Ferman et al. |
| 2005/0174586 | A1 | 8/2005 | Yoshida et al. |
| 2005/0180647 | A1 | 8/2005 | Curry et al. |
| 2005/0281474 | A1 | 12/2005 | Huang |
| 2006/0072830 | A1 | 4/2006 | Nagarajan et al. |
| 2006/0133690 | A1 | 6/2006 | Bloomberg et al. |
| 2006/0153441 | A1 | 7/2006 | Li |
| 2006/0221090 | A1 | 10/2006 | Takeshima et al. |
| 2007/0291120 | A1 | 12/2007 | Campbell et al. |
| 2008/0212864 | A1 | 9/2008 | Bornefalk |

FOREIGN PATENT DOCUMENTS

| | | |
|---|---|---|
| JP | 08-065514 A | 3/1996 |
| JP | 2002-325182 | 11/2002 |
| JP | 2003-123072 A | 4/2003 |
| JP | 2004-110606 A | 4/2004 |
| JP | 2007-235953 A | 9/2007 |
| WO | 2005/067586 A2 | 7/2005 |
| WO | 2006/066325 A1 | 6/2006 |

OTHER PUBLICATIONS

Feng et al, "Exploring the use of conditional random field models and HMMs for histogrical handwritten document recognition", Apr. 2006, DIAL'06, IEEE, pp. 1-8.*

Richard Berry and Jim Burnell, "The histogram is a graph of pixel value V.S the number of pixels having that value", 2000, pp. 1-3, from: www.willbell.com/AIP4Win_Updater/Histogram%20Tool.pdf.*

Lienhart et al, "Localizing and segmenting text in images and videos", Apr. 2002, IEEE on Trans. CSVT, pp. 256-268.*

U.S. Appl. No. 11/424,296—Office action dated Apr. 2, 2009.

U.S. Appl. No. 11/424,297—Office action dated Apr. 28, 2009.

U.S. Appl. No. 11/424,290—Office action dated Nov. 27, 2007.

U.S. Appl. No. 11/424,290—Office action dated May 28, 2008.

U.S. Appl. No. 11/424,290—Office action dated Oct. 27, 2008.

U.S. Appl. No. 11/424,290—Supplemental Office action dated Feb. 10, 2009.

U.S. Appl. No. 11/367,244—Office action dated Mar. 30, 2009.

Japanese Patent Application No. 2007-229562—Office action—Mailing date Mar. 3, 2009.

U.S. Appl. No. 11/424,296—Office action dated Oct. 28, 2009.

U.S. Appl. No. 11/367,244—Office action dated Nov. 3, 2009.

U.S. Appl. No. 11/424,297—Office action dated Oct. 22, 2009.

Japanese Patent Application No. 2007-035511—Office action—Mailing date Jul. 21, 2009.

Japanese Patent Application No. 2007-035511—Office action—Mailing date Dec. 15, 2009.

U.S. Appl. No. 11/424,290—Office action dated Jul. 17, 2009.

* cited by examiner

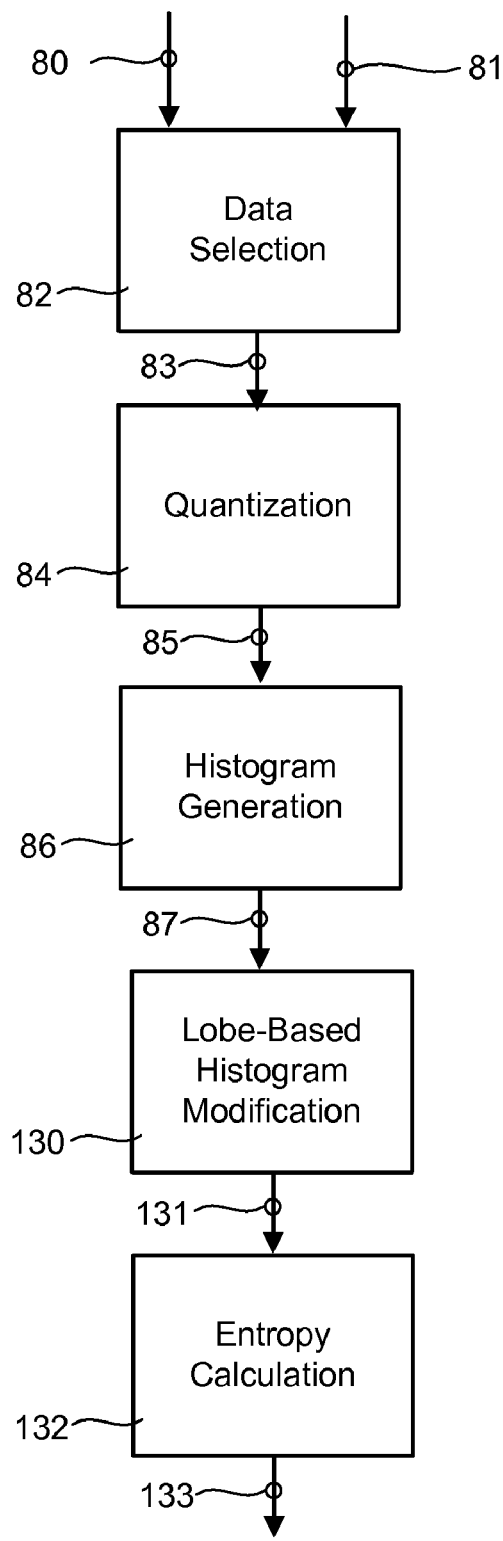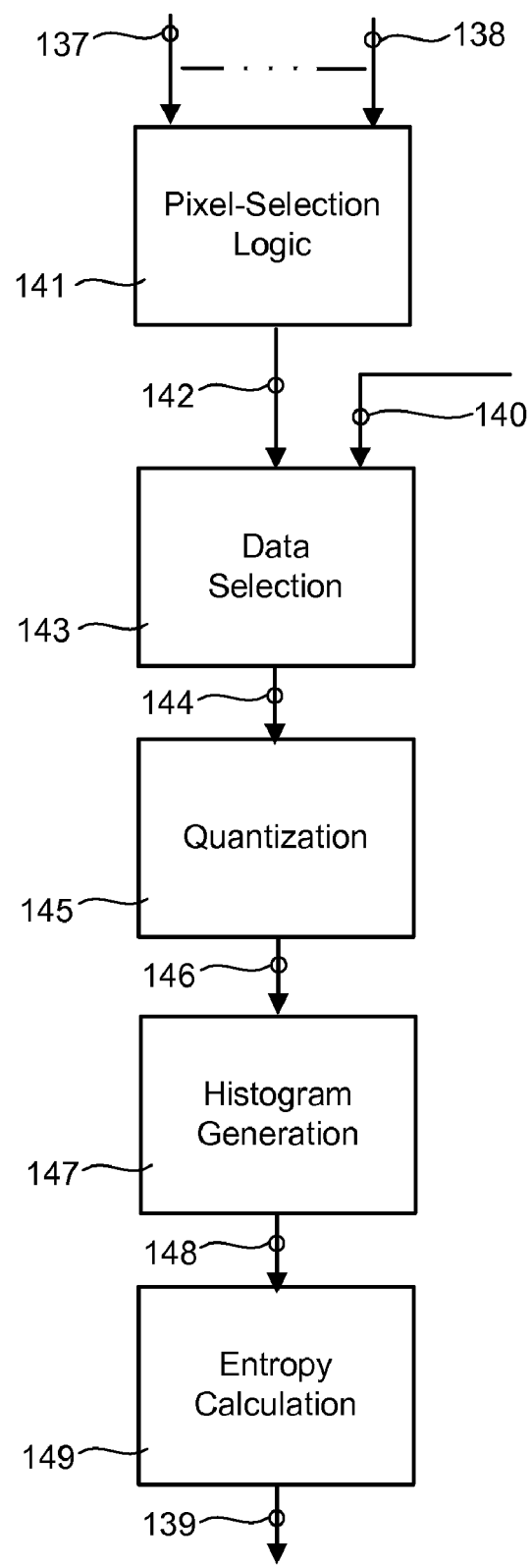
FIG. 13
FIG. 14

METHODS AND SYSTEMS FOR DETECTING REGIONS IN DIGITAL IMAGES

RELATED REFERENCES

This application is a continuation-in-part of U.S. patent application Ser. No. 11/367,244, entitled "Methods and Systems for Detecting Regions in Digital Images," filed on Mar. 2, 2006.

FIELD OF THE INVENTION

Embodiments of the present invention comprise methods and systems for detecting regions in digital images.

BACKGROUND

The content of a digital image can have considerable impact on the compression of the digital image, both in terms of compression efficiency and compression artifacts. Pictorial regions in an image are not efficiently compressed using compression algorithms designed for the compression of text. Similarly, text images are not efficiently compressed using compression algorithms that are designed and optimized for pictorial content. Not only is compression efficiency affected when a compression algorithm designed for one type of image content is used on a different type of image content, but the decoded image may exhibit visible compression artifacts.

Further, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

The detection of regions of a particular content type in a digital image can improve compression efficiency, reduce compression artifacts, and improve image quality when used in conjunction with a compression algorithm or image enhancement algorithm designed for the particular type of content.

The semantic labeling of image regions based on content is also useful in document management systems and image databases.

Reliable and efficient detection of regions of pictorial content and other image regions in digital images is desirable.

SUMMARY

Embodiments of the present invention comprise methods and systems for classifying an image into regions using a masking condition and an entropy measure.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 13 is a diagram showing exemplary embodiments of the present invention comprising lobe-based histogram modification;

FIG. 14 is a diagram showing exemplary embodiments of the present invention comprising pixel selection logic using multiple mask input;

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
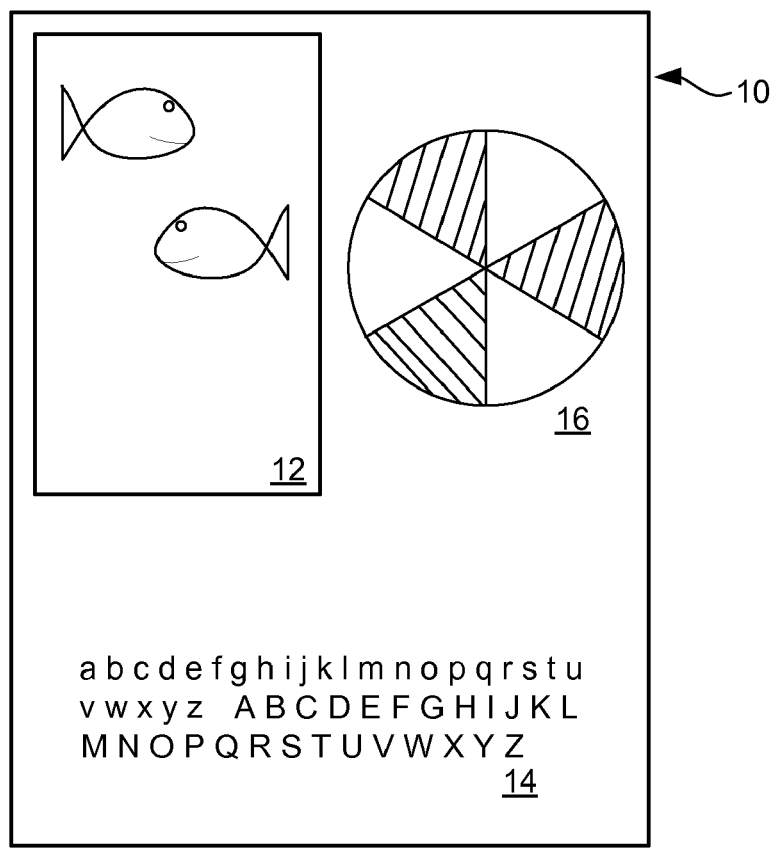
FIG. 1 is an example of an image comprising a multiplicity of regions of different content type.

FIG. 1 shows an image 10 comprising three regions: a pictorial region 12, a text region 14, and a graphics region 16. For many image processing, compression, document management, and other applications, it may be desirable to detect various regions in an image. Exemplary regions may include: a pictorial region, a text region, a graphics region, a half-tone region, a continuous-tone region, a color region, a black-and-white region, a region best compressed by Joint Photographic Experts Group (JPEG) compression, a region best compressed by Joint Bi-level Image Experts Group (JBIG) compression, a background region, and a foreground region.

Figure 2:
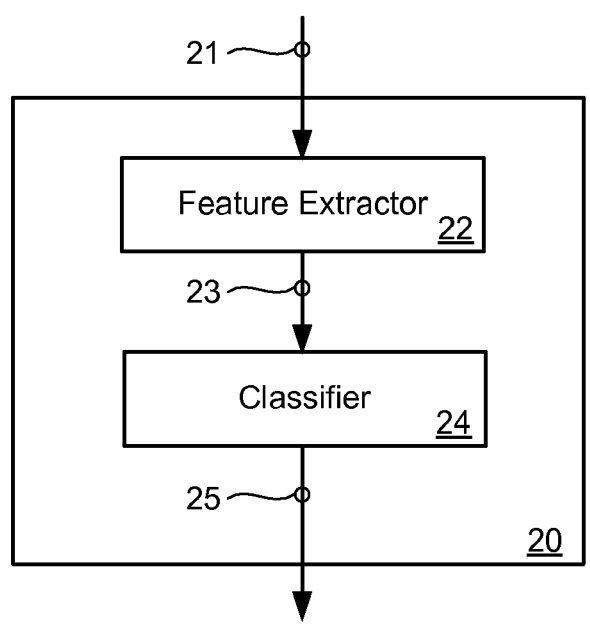
FIG. 2 is a diagram of an exemplary region-detection system (prior art)

An exemplary region-detection system 20 is shown in FIG. 2. A region-detection system 20 may include a feature extractor 22 and a classifier 24. The feature extractor 22 may measure, calculate, or in some way extract, a feature or features 23 from a digital image 21. The classifier 24 may classify portions of the image 21 based on the extracted feature or features 23. The classification 25 produced by the classifier 24 thereby provides detection of image regions and segmentation of the digital image 21.

Figure 3:
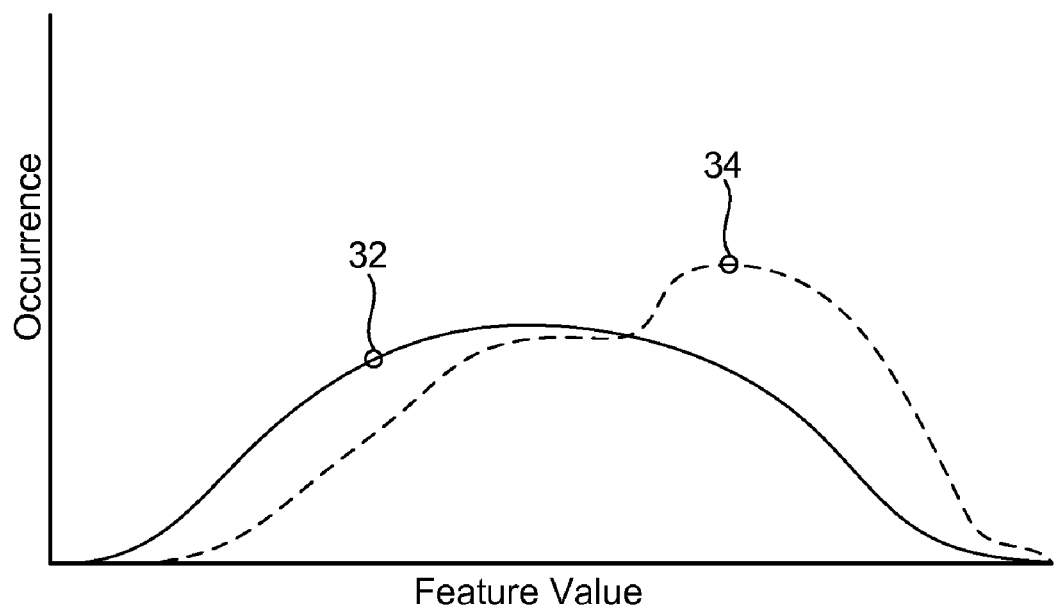
FIG. 3 is an exemplary histogram showing feature value separation.

The effectiveness and reliability of a region-detection system may depend on the feature or features used for the classification. FIG. 3 shows an example of normalized frequency-of-occurrence plots of the values of a feature for two different image regions. The solid line 32 shows the frequency of occurrence of feature values extracted from image samples belonging to one region. The dashed line 34 shows the frequency of occurrence of feature values extracted from image samples belonging to a second region. The strong overlap of these two curves may indicate that the feature may not be an effective feature for separating image samples belonging to one of these two regions.

Figure 4:
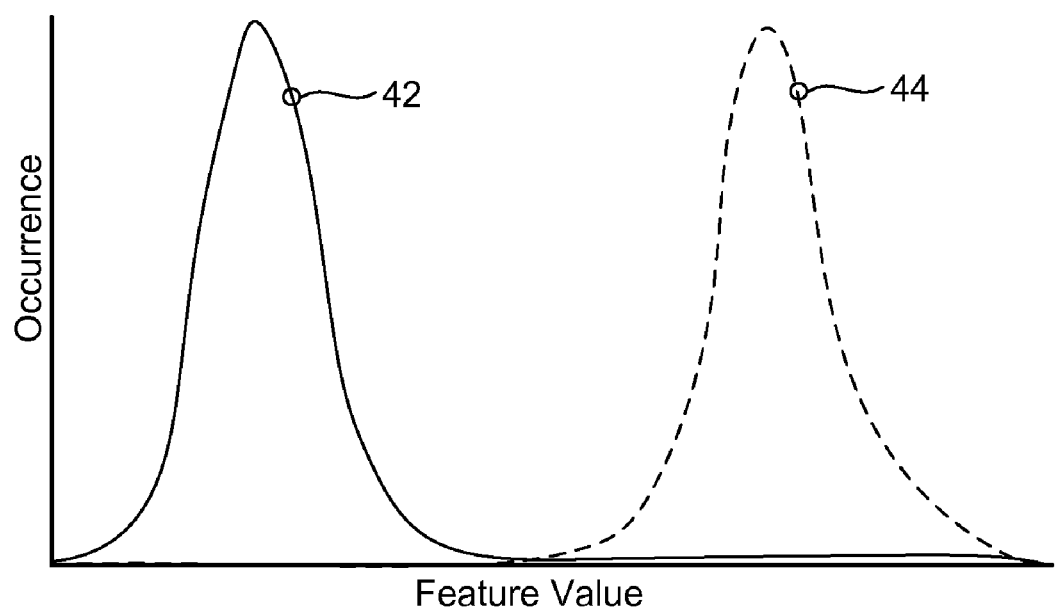
FIG. 4 is an exemplary histogram showing feature value separation.

FIG. 4 shows another example of normalized frequency-of-occurrence plots of the values of a feature for two different image regions. The solid line 42 shows the frequency of occurrence of feature values extracted from image samples belonging to one region. The dashed line 44 shows the frequency of occurrence of feature values extracted from image samples belonging to a second region. The wide separation of these two curves may indicate that the feature will be an effective feature for classifying image samples as belonging to one of these two regions.

For the purposes of this specification, associated claims, and included drawings, the term histogram will be used to refer to frequency-of-occurrence information in any form or format, for example, that represented as an array, a plot, a linked list and any other data structure associating a frequency-of-occurrence count of a value, or group of values, with the value, or group of values. The value, or group of values, may be related to an image characteristic, for example, color (luminance or chrominance), edge intensity, edge direction, texture, and any other image characteristic.

Embodiments of the present invention comprise methods and systems for region detection in a digital image. Some embodiments of the present invention comprise methods and systems for region detection in a digital image wherein the separation between feature values corresponding to image regions may be accomplished by masking, prior to feature extraction, pixels in the image for which a masking condition is met. In some embodiments, the masked pixel values may not be used when extracting the feature value from the image.

Figure 5:
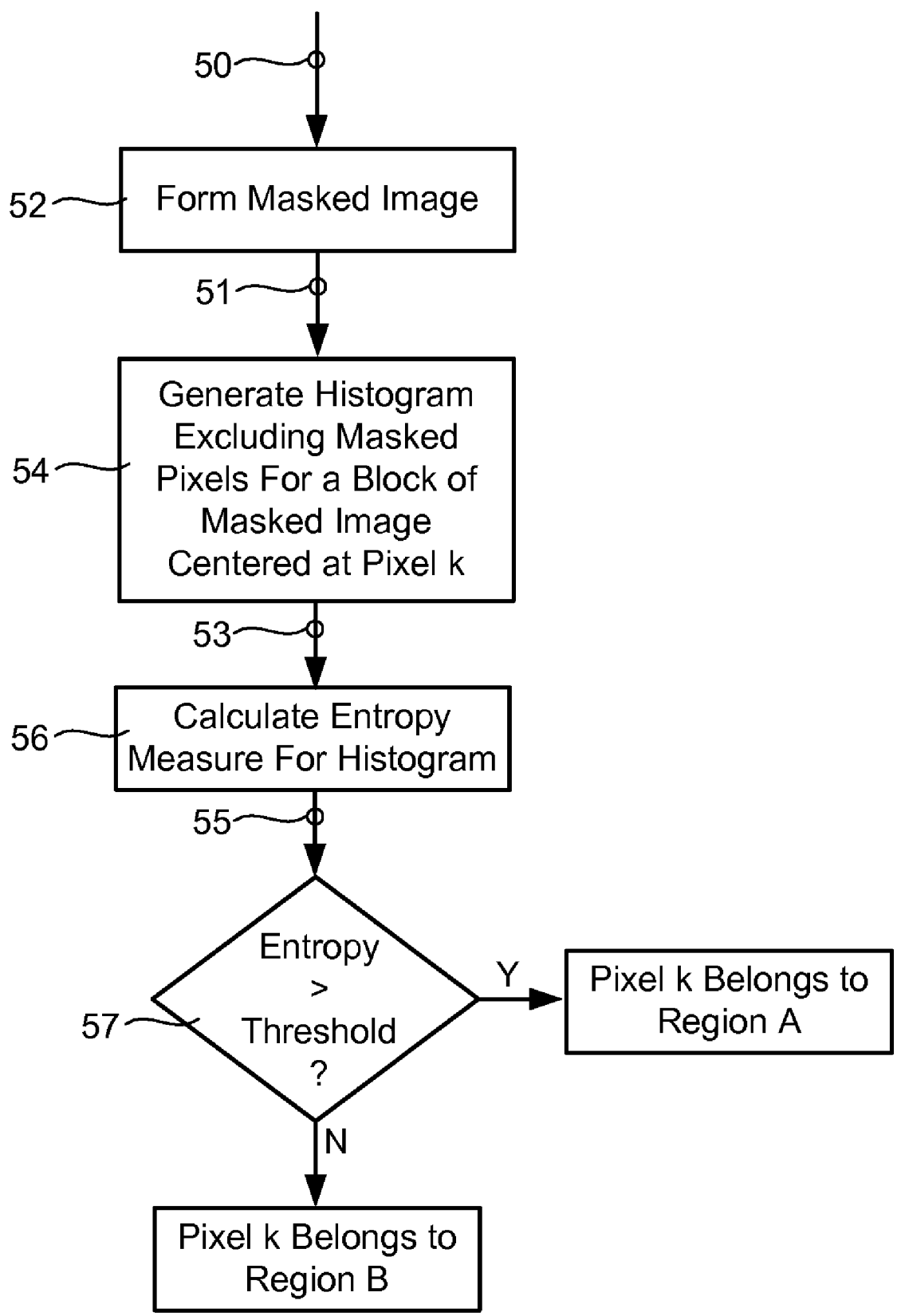
FIG. 5 is a diagram showing exemplary embodiments of the present invention comprising a masked-entropy calculation from a histogram.
Figure 6:
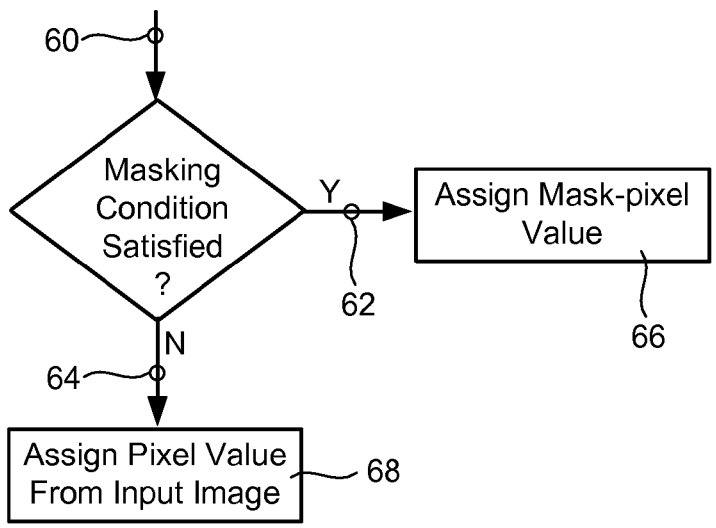
FIG. 6 is a diagram showing an exemplary embodiment of masked-image generation.

In some exemplary embodiments of the present invention shown in FIG. 5, a masked image 51 may be formed 52 from an input image 50. The masked image 51 may be formed 52 by checking a masking condition at each pixel in the input image 50. An exemplary embodiment shown in FIG. 6 illustrates the formation of the masked image. If an input-image pixel 60 satisfies 62 the masking condition, the value of the pixel at the corresponding location in the masked image may be assigned 66 a value, which may be called a mask-pixel value, indicating that the masking condition is satisfied at that pixel location in the input image. If an input-image pixel 60 does not satisfy 64 the masking condition, the value of the pixel at the corresponding location in the masked image may be assigned the value of the input pixel in the input image 68. The masked image thereby masks pixels in the input image for which a masking condition is satisfied.

In the exemplary embodiments of the present invention shown in FIG. 5, after forming 52 the masked image 51, a histogram 53 may be generated 54 for a block, also considered a segment, section, or any division, not necessarily rectangular in shape, of the masked image 51. For the purposes of this specification, associated claims, and included drawings, the term block will be used to describe a portion of data of any shape including, but not limited to, square, rectangular, circular, elliptical, or approximately circular.

Figure 7:
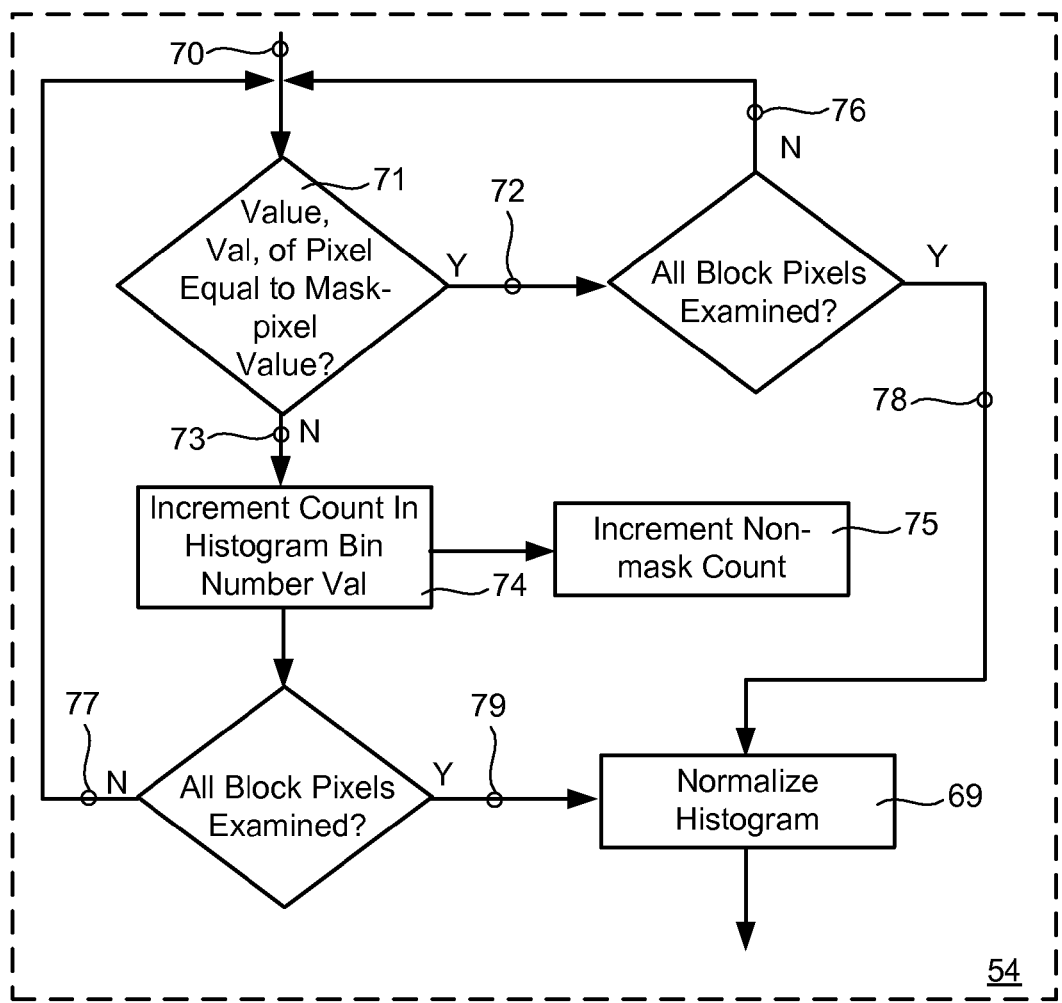
FIG. 7 is a diagram showing an exemplary embodiment of histogram generation.

FIG. 7 shows an exemplary embodiment of histogram formation 54. A histogram with bins corresponding to the possible pixel values of the masked image may be formed according to FIG. 7. In some embodiments, all bins may be initially considered empty with initial count zero. The value of a pixel 70 in the block of the masked image may be compared 71 to the mask-pixel value. If the value of the pixel 70 is equal 72 to the mask-pixel value, then the pixel is not accumulated in the histogram, meaning that no histogram bin is incremented, and if there are pixels remaining in the block to examine 76, then the next pixel in the block is examined 71. If the value of the pixel 70 is not equal 73 to the mask-pixel value, then the pixel is accumulated in the histogram 74, meaning that the histogram bin corresponding to the value of the pixel is incremented, and if there are pixels remaining in the block to examine 77, then the next pixel is examined 71.

When a pixel is accumulated in the histogram 74, a counter for counting the number of non-mask pixels in the block of the masked image may be incremented 75. When all pixels in a block have been examined 78, 79, the histogram may be normalized 69. The histogram may be normalized 69 by dividing each bin count by the number of non-mask pixels in the block of the masked image. In alternate embodiments, the histogram may not be normalized and the counter may not be present.

Alternately, the masked image may be represented in two components: a first component that is a binary image, also considered a mask, in which masked pixels may be represented by one of the bit values and unmasked pixels by the other bit value, and a second component that is the digital image. The logical combination of the mask and the digital image forms the masked image. The histogram formation may be accomplished using the two components of the masked image in combination.

An entropy measure 55 may be calculated 56 for the histogram 53 of a block of the masked image. The entropy measure 55 may be considered an image feature of the input image. The entropy measure 55 may be considered any measure of the form:

$$-\sum_{i=1}^{N} h(i) * f(h(i)),$$

where N is the number of histogram bins, h(i) is the accumulation or count of bin i, and $f(\cdot)$ may be a function with mathematical characteristics similar to a logarithmic function. The entropy measure 55 may be weighted by the proportion of pixels that would have been counted in a bin, but were masked. The entropy measure is of the form:

$$-\sum_{i=1}^{N} w(i)h(i) * f(h(i))$$

where w(i) is the weighting function. In some embodiments of the present invention, the function $f(h(i))$ may be $\log_2 (h(i))$.

In the embodiments of the present invention shown in FIG. 5, after calculating 56 the entropy measure 55 for the histogram 53 corresponding to a block of the image centered at a pixel, the pixel may be classified 57 according to the entropy feature 55. In some embodiments, the classifier 57 may be based on thresholding. A threshold may be determined a priori, adaptively, or by any of numerous methods. The pixel may be classified 57 as belonging to one of two regions depending on which side of the threshold the entropy measure 55 falls.

Figure 8:
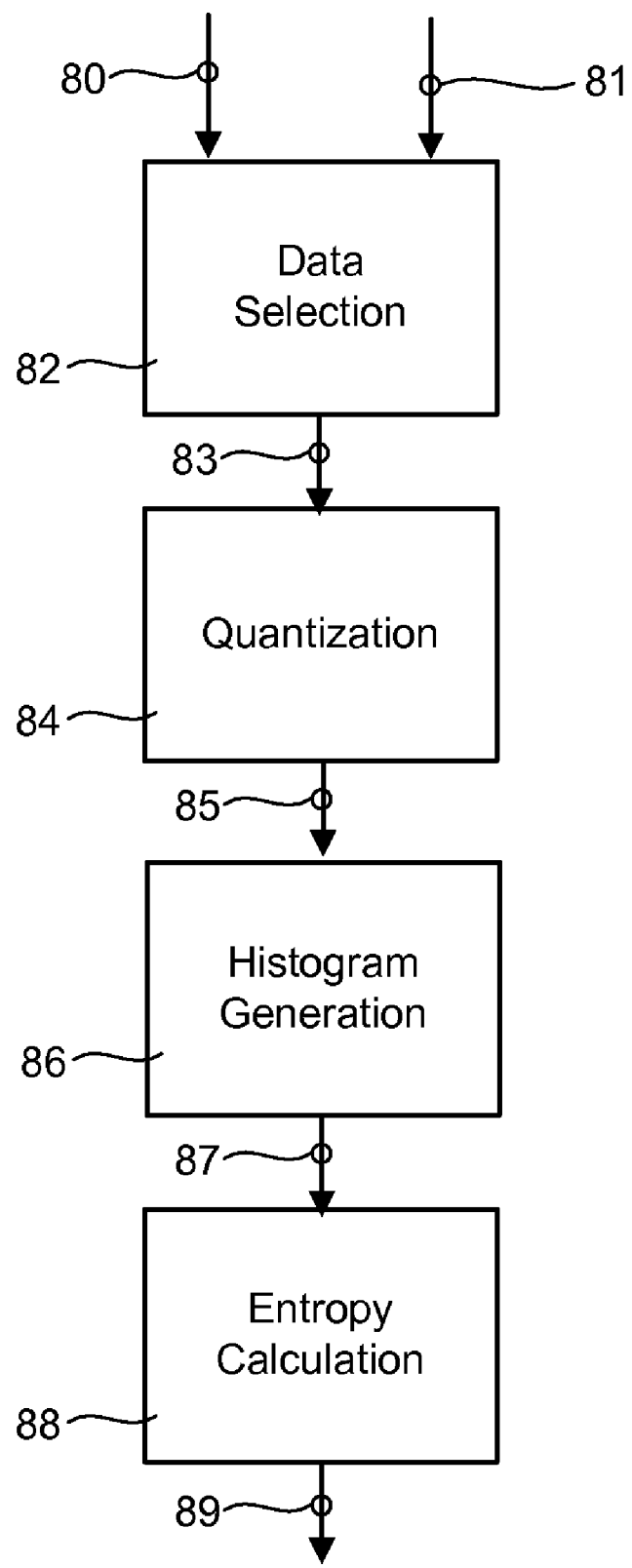
FIG. 8 is a diagram showing exemplary embodiments of the present invention comprising masking, quantization, histogram generation and entropy calculation.

In some embodiments of the present invention shown in FIG. 8, a digital image 80 and a corresponding mask image 81 may be combined 82 to form masked data 83. The masked data 83 may be quantized 84 forming quantized, masked data 85. The histogram 87 of the quantized, masked data 85 may be generated 86, and an entropy measure 89 may be calculated 88 using the histogram of the quantized, masked data 87. The computational expense of the histogram generation 86 and the entropy calculation 88 may depend on the level, or degree, of quantization of the masked data. The number of histogram bins may depend of the number of quantization levels, and the number of histogram bins may influence the computational expense of the histogram generation 86 and the entropy calculation 88. Due to scanning noise and other factors, uniform areas in a document may not correspond to a single color value in a digital image of the document. In some embodiments of the present invention shown in FIG. 8, the degree of quantization may be related to the expected amount of noise for a uniformly colored area on the document. In some embodiments, the quantization may be uniform. In alternate embodiments, the quantization may be variable. In some embodiments, the quantization may be related to a power of two. In some embodiments in which the quantization is related to a power of two, quantization may be implemented using shifting.

In some embodiments of the present invention, the masked data may not be quantized, but the number of histogram bins may be less than the number of possible masked data values. In these embodiments, a bin in the histogram may represent a range of masked data values.

Figure 9:
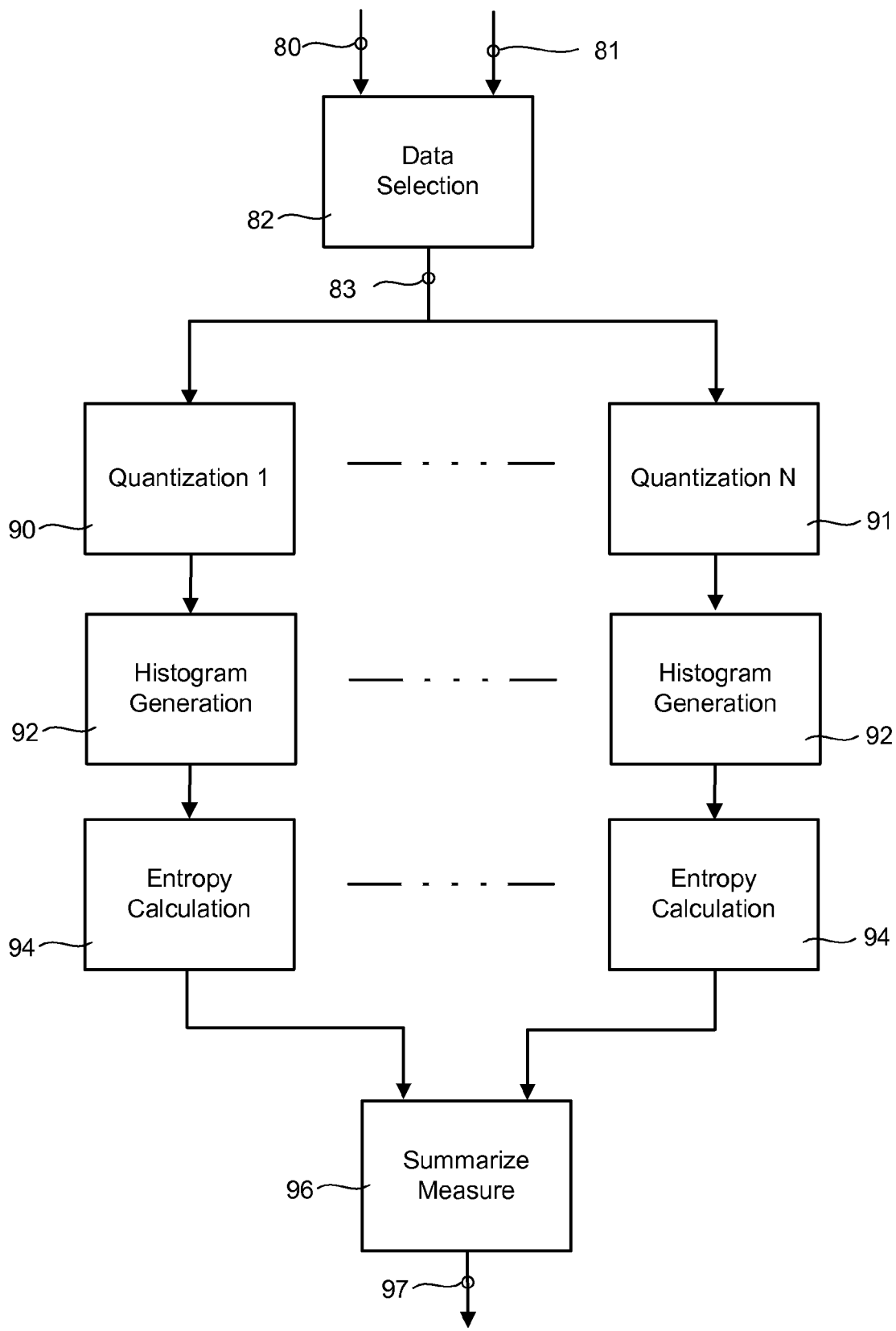
FIG. 9 is a diagram showing exemplary embodiments of the present invention comprising multiple quantization of select data and multiple entropy calculations.

In some embodiments of the present invention shown in FIG. 9, quantization 90, 91, histogram generation 92, and calculation of entropy 94 may be performed multiple times on the masked data 83 formed by the combination 82 of the digital image 80 and the corresponding mask image 81. The masked data may be quantized using different quantization methods 90, 91. In some embodiments, the different quantization methods may correspond to different levels of quantization. In some embodiments, the different quantization methods may be of the same level of quantization with histogram bin boundaries shifted. In some embodiments, the histogram bin boundaries may be shifted by one-half of a bin width. A histogram may be generated 92 from the data produced by each quantization method 90, 91, and an entropy calculation 94 may be made for each histogram. The multiple entropy measures produced may be combined 96 to form a single measure 97. The single entropy measure may be the average, the maximum, the minimum, a measure of the variance, or any other combination of the multiple entropy measures.

Figure 10:
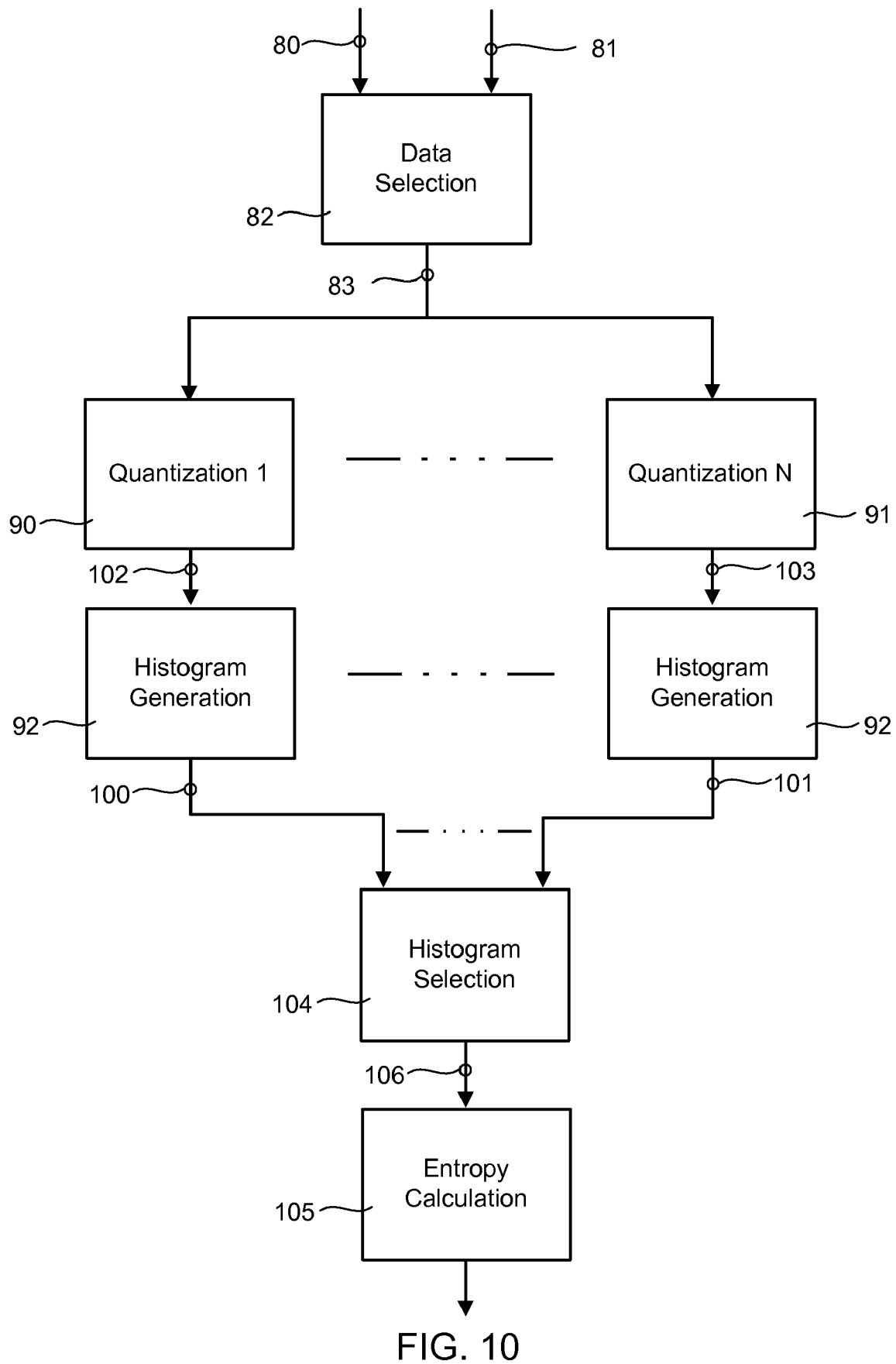
FIG. 10 is a diagram showing exemplary embodiments of the present invention comprising multiple quantization of select data.

In alternate embodiments of the present invention shown in FIG. 10, data 83 formed by the combination 82 of the digital image 80 and the corresponding mask image 81 may be quantized using different quantization methods 90, 91. Multiple histograms 100, 101 may be formed 92 based on multiple quantizations 102, 103. One histogram 106 from the multiple histograms 100, 101 may be selected 104 for the entropy calculation 105. In some embodiments, the entropy calculation may be made using the histogram with the largest single-bin count. In alternate embodiments, the histogram with the largest single lobe may be used.

Figure 11:
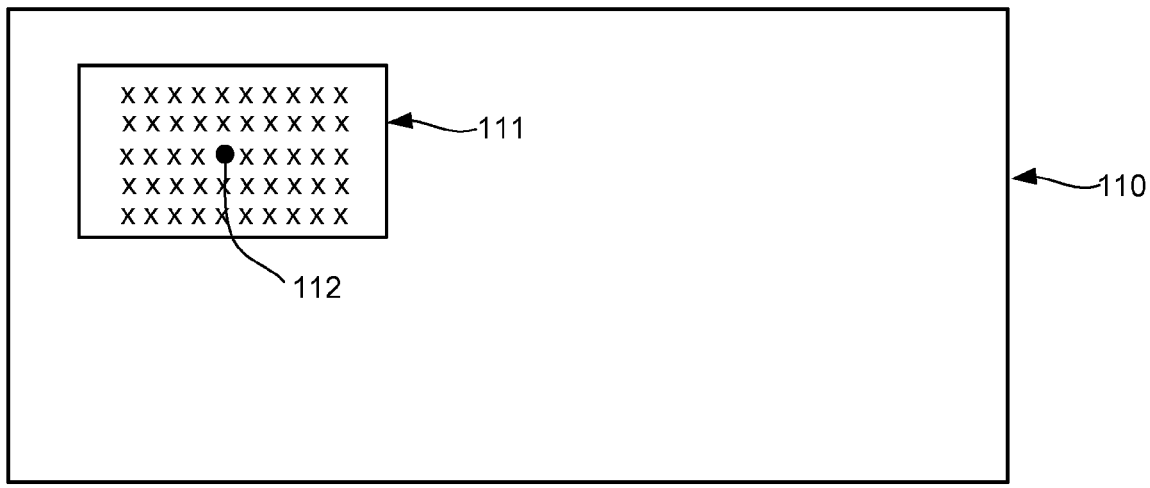
FIG. 11 is diagram showing pixel classification comprising an image window.

In some embodiments of the present invention, a moving window of pixel values centered, in turn, on each pixel of the image, may be used to calculate the entropy measure for the block containing the centered pixel. The entropy may be calculated from the corresponding block in the masked image. The entropy value may be used to classify the pixel at the location on which the moving window is centered. FIG. 11 shows an exemplary embodiment in which a block of pixels is used to measure the entropy feature which is used to classify a single pixel in the block. In FIG. 11, a block 111 is shown for an image 110. The pixels in the masked image in the block 111 may be used to calculate the entropy measure, which may be considered the entropy measure at pixel 112. The pixel in the center of the block 112 may be classified according the entropy measure.

Figure 12:
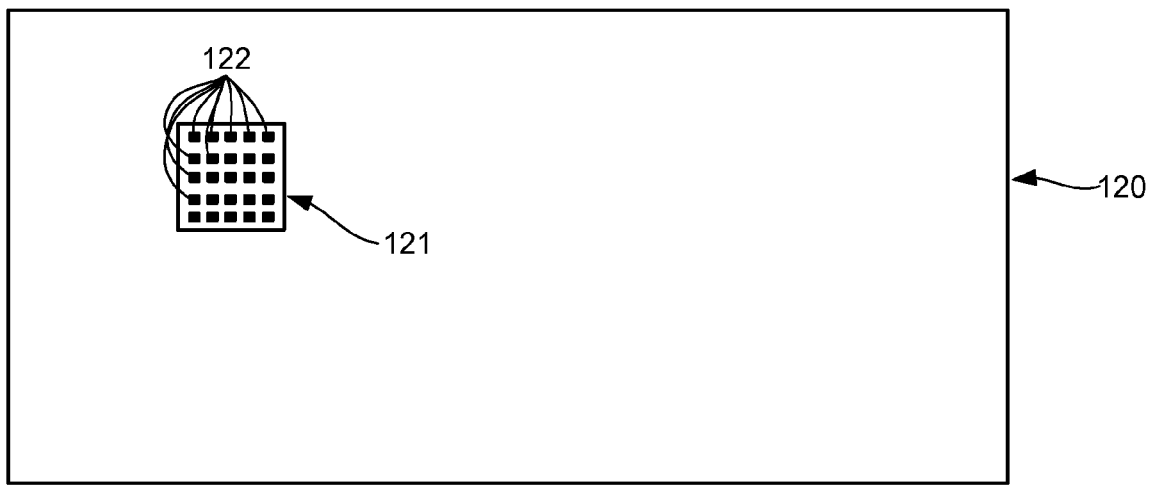
FIG. 12 is a diagram showing block classification comprising an image window.

In other embodiments of the present invention, the entropy value may be calculated for a block of the image, and all pixels in the block may be classified with the same classification based on the entropy value. FIG. 12 shows an exemplary embodiment in which a block of pixels is used to measure the entropy feature which is used to classify all pixels in the block. In FIG. 12, a block 121 is shown for an image 120. The pixels in the masked image in the corresponding block may be used to calculate the entropy measure. All pixels 122 in the block 121 may be classified according to the entropy measure.

In some embodiments of the present invention shown in FIG. 13, the entropy may be calculated considering select lobes, also considered peaks, of the histogram. A digital image 80 and a corresponding mask image 81 may be combined 82 to form masked data 83. The masked data 83 may be quantized 84 forming quantized, masked data 85. The histogram 87 of the quantized, masked data 85 may be generated 86, a modified histogram 131 may be generated 130 to consider select lobes of the histogram 87, and an entropy measure 133 may be calculated 132 using the modified histogram of the quantized, masked data 131. In some embodiments, a single lobe of the histogram 87 may be considered. In some embodiments, the single lobe may be the lobe containing the image value of the center pixel of the window of image data for which the histogram may be formed.

FIG. 14 shows embodiments of the present invention in which a digital image 140 may be combined 143 with output 142 of a pixel-selection module 141 to generate data 144 which may be considered in the entropy calculation. The data 144 may be quantized 145. A histogram 148 may be formed 147 from the quantized data 146, and an entropy measure 139 may be calculated 149 for the histogram 148. The pixel-selection module 141 comprises pixel-selection logic that may use multiple masks 137, 138 as input. A mask 137, 138 may correspond to an image structure. Exemplary image structures may include text, halftone, page background, and edges. The pixel-selection logic 141 generates a selection mask 142 that is combined with the digital image 140 to select image pixels that may be masked in the entropy calculation.

In some embodiments of the present invention, the masking condition may be based on the edge strength at a pixel.

In some embodiments of the present invention, a level of confidence in the degree to which the masking condition is satisfied may be calculated. The level of confidence may be used when accumulating a pixel into the histogram. Exemplary embodiments in which a level of confidence is used are shown in FIG. 15.

Figure 15:
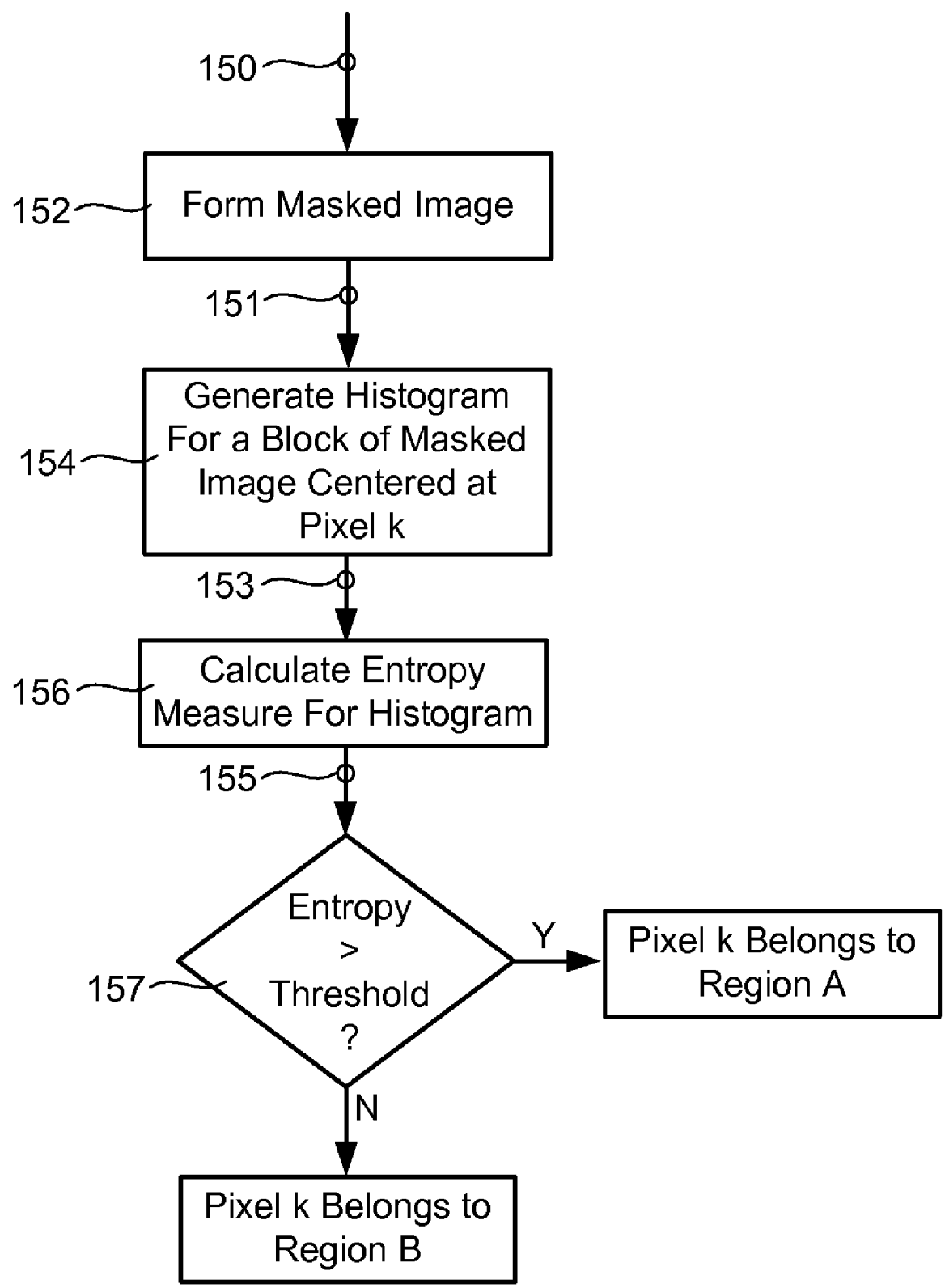
FIG. 15 is a diagram showing exemplary embodiments of the present invention comprising a masked-entropy calculation from a histogram using confidence levels.
Figure 16:
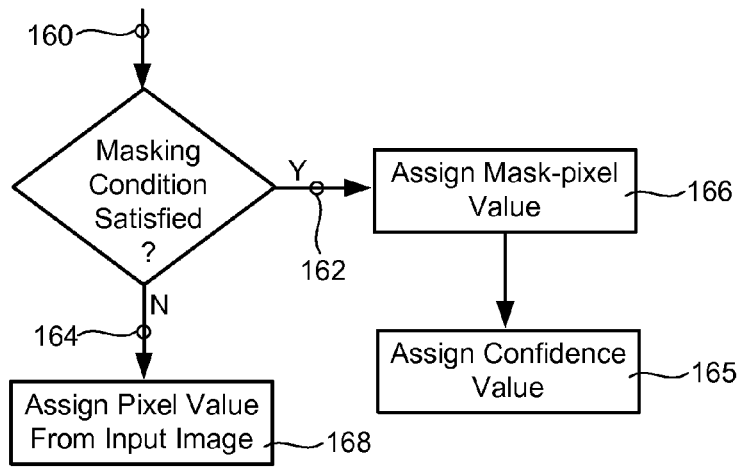
FIG. 16 is a diagram showing an exemplary embodiment of masked-image generation using confidence levels.

In exemplary embodiments of the present invention shown in FIG. 15, a masked image 151 may be formed 152 from an input image 150. The masked image 151 may be formed by checking a masking condition at each pixel in the input image 150. An exemplary embodiment shown in FIG. 16, illustrates the formation 152 of the masked image 151. If an input image pixel 160 satisfies 162 the masking condition, the corresponding pixel in the masked image may be assigned 166 a value, mask-pixel value, indicating that the masking condition is satisfied at that pixel. If an input image pixel 160 does not satisfy the masking condition 164, the corresponding pixel in the masked image may be assigned the value of the corresponding pixel in the input image 168. At pixels for which the masking condition is satisfied 162, a further assignment 165 of a confidence value reflecting the confidence in the mask signature signal may be made. The assignment of confidence value may be a separate value for the masked pixels, or the mask-pixel value may be multi-level with the levels representing the confidence. The masked image may mask pixels in the input image for which a masking condition is satisfied, and further identify the level to which the masking condition is satisfied.

Figure 17:
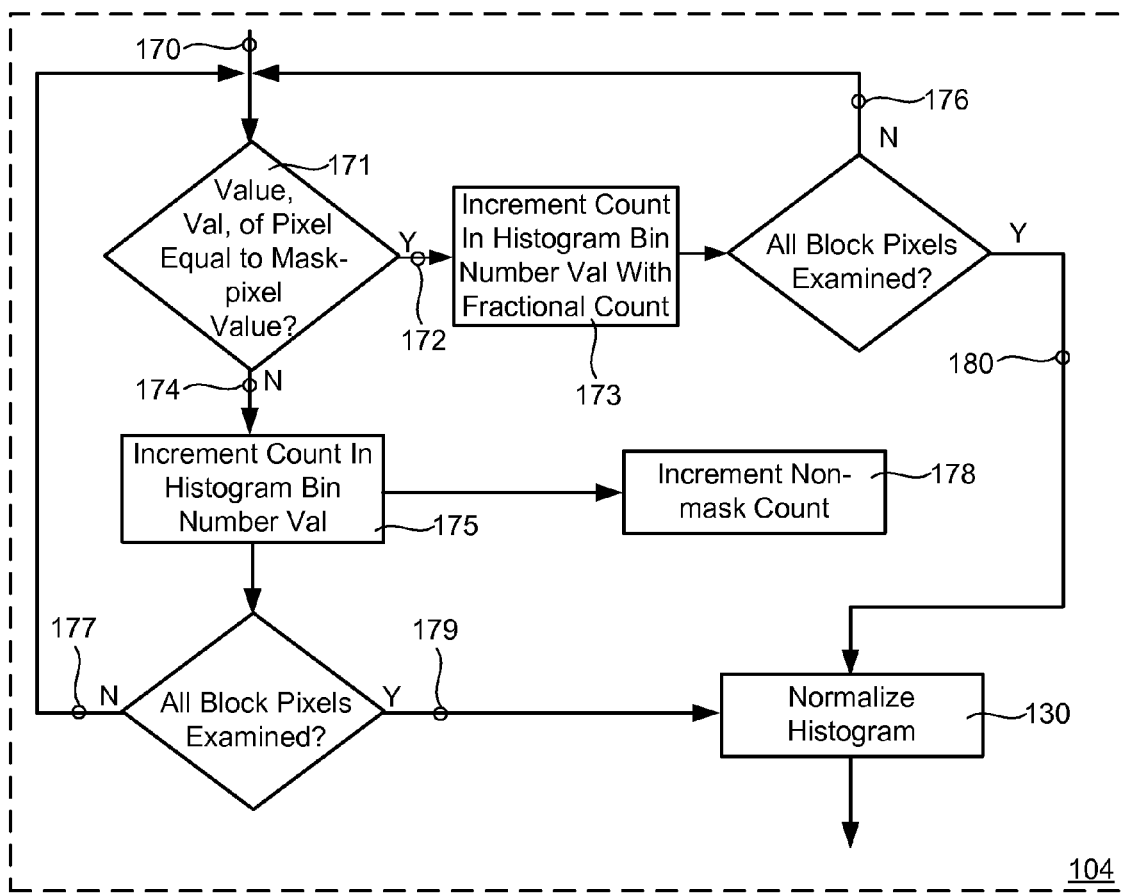
FIG. 17 is a diagram showing an exemplary embodiment of histogram generation using confidence levels.

In the exemplary embodiments of the present invention shown in FIG. 15, after forming 152 the masked image 151, a histogram 153 may be generated 154 for a block of the masked image 151. FIG. 17 shows an exemplary embodiment of histogram formation 154. A histogram with bins corresponding to the possible pixel values of the masked image may be formed according to FIG. 17. In some embodiments, all bins may be initially considered empty with initial count zero. The value of a pixel 170 in the block of the masked image may be compared 171 to the mask-pixel value. If the value of the pixel 170 is equal 172 to the mask-pixel value, then the pixel is accumulated 173 in the histogram at a fractional count based on the confidence value, and if there are pixels remaining in the block to examine 176, then the next pixel in the block is examined 171. If the value of the pixel 170 is not equal 174 to the mask-pixel value, then the pixel is accumulated in the histogram 175, meaning that the histogram bin corresponding to the value of the pixel is incremented, and if there are pixels remaining in the block to examine 177, then the next pixel in the block is examined 171.

When a pixel is accumulated in the histogram 175, a counter for counting the number of non-mask pixels in the block of the masked image may be incremented 178. When all pixels in a block have been examined 180, 179, the histogram may be normalized 130. The histogram may be normalized 130 by dividing each bin count by the number of non-mask pixels in the block of the masked image. In alternate embodiments, the histogram may not be normalized and the counter not be present.

An entropy measure 155 may be calculated 156 for the histogram of a neighborhood of the masked image as described in the previous embodiments. In the embodiments of the present invention shown in FIG. 15, after calculating 156 the entropy measure 155 for the histogram 153 corresponding to a block of the image centered at a pixel, the pixel may be classified 157 according to the entropy feature 155. The classifier 157 shown in FIG. 15 may be based on thresholding. A threshold may be determined a priori, adaptively, or by any of numerous methods. The pixel may be classified 157 as belonging to one of two regions depending on which side of the threshold the entropy measure 155 falls.

In some embodiments of the present invention, the masking condition may comprise a single image condition. In some embodiments, the masking condition may comprise multiple image conditions combined to form a masking condition.

In some embodiments of the present invention, the entropy feature may be used to separate the image into two regions. In some embodiments of the present invention, the entropy feature may be used to separate the image into more than two regions.

In some embodiments of the present invention, the full dynamic range of the data may not be used. The histogram may be generated considering only pixels with values between a lower and an upper limit of dynamic range.

In some embodiments of the present invention, the statistical entropy measure may be as follows:

$$E = -\sum_{i=1}^{N} h(i) * \log_2(h(i)),$$

where N is the number of bins, h(i) is the normalized $$\left(\sum_{i=1}^{N} h(i) = 1\right)$$

histogram count for bin i, and $\log_2 (0)=1$ may be defined for empty bins.

The maximum entropy may be obtained for a uniform histogram distribution, $$h(i) = \frac{1}{N},$$

for every bin. Thus, $$Emax = -\sum_{i=1}^{N} \frac{1}{N} * \log_2\left(\frac{1}{N}\right) = -\log_2\left(\frac{1}{N}\right).$$

The entropy calculation may be transformed into fixed-point arithmetic to return an unsigned, 8-bit, uint8, measured value, where zero corresponds to no entropy and 255 corresponds to maximum entropy. The fixed-point calculation may use two tables: one table to replace the logarithm calculation, denoted log_table below, and a second table to implement division in the histogram normalization step, denoted rev_table. Integer entropy calculation may be implemented as follows for an exemplary histogram with nine bins:

$$\text{log\_table}[i] = 2^{\text{log\_shift}} * \log_2(i)$$

$$s = \sum_{i=0}^{8} \text{hist}[i]$$

$$\text{rev\_table}[i] = \frac{2^{\text{rev\_shift}} * \frac{255}{E_{max}}}{i}$$

$$s\_log = \text{log\_table}[s]$$

$$s\_rev = \text{rev\_table}[s]$$

$$bv[i] = \text{hist}[i] * s\_rev$$

$$\text{log\_diff}[i] = s\_log - \text{log\_table}[\text{hist}[i]]$$

$$E = \left( \sum_{i=0}^{NBins} ((bv[i] * \text{log\_diff}[i]) >> (\text{log\_shift} + \text{rev\_shift} - \text{accum\_shift})) \right) >> \text{accum\_shift}$$

where log_shift, rev_shift, and accum_shift may be related to the precision of the log, division, and accumulation operations, respectively.

An alternate hardware implementation may use an integer divide circuit to calculate n, the normalized histogram bin value.

$$n = (\text{hist}[i] << 8)/s$$

$$E_{bin} = (81 * n * \text{log\_table}[n]) >> 16$$

$$E = \sum_{i=0}^{NBins} E_{bin}[i].$$

In the example, the number of bins is nine (N=9), which makes the normalization multiplier $255/E_{max}=81$.

The fixed-point precision of each calculation step may be adjusted depending upon the application and properties of the data being analyzed. Likewise the number of bins may also be adjusted.

In some embodiments of the present invention, pictorial regions may be detected in an image using a staged refinement process that may first analyze the image and its derived image features to determine likely pictorial regions. Verification and refinement stages may follow initial determination of the likely pictorial regions. In some embodiments of the present invention, masked entropy may be used to initially separate pictorial image regions from non-pictorial image regions. Due to the uniform nature of page background and local background regions in a digital image, such regions will have low entropy measures. Pictorial regions may have larger entropy measures due to the varying luminance and chrominance information in pictorial regions compared to the more uniform background regions. Text regions, however, may also have large entropy measures due to the edge structure of text. It may be desirable to mask text pixels when determining entropy measures for identifying pictorial regions in images. Alternatively, masking of all strong edge structures, which may include buildings, signs, and other man-made structures in pictorial regions in addition to text, may reduce identification of text regions as pictorial regions while not significantly reducing the identification of pictorial regions. While pictorial regions typically have greater entropy measures, more uniform pictorial regions such as sky regions, may have low entropy measure, and such regions may be missed in the detection of pictorial regions based on entropy or masked entropy.

Figure 18:
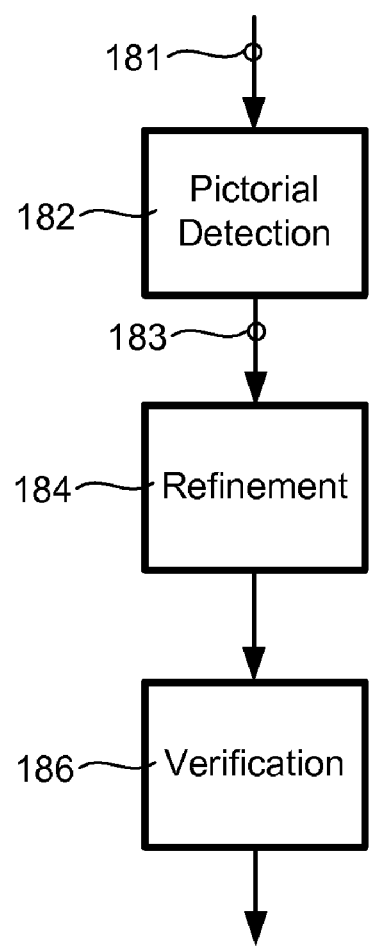
FIG. 18 is a diagram showing exemplary embodiments of the present invention comprising refinement and verification.

Some embodiments of the present invention shown in FIG. 18 may include refinement 184 of the initial pictorial map 183 detected 182 based on masked entropy measures in the digital image 181. In some embodiments, verification 186 may follow the refinement 184.

Figure 19:
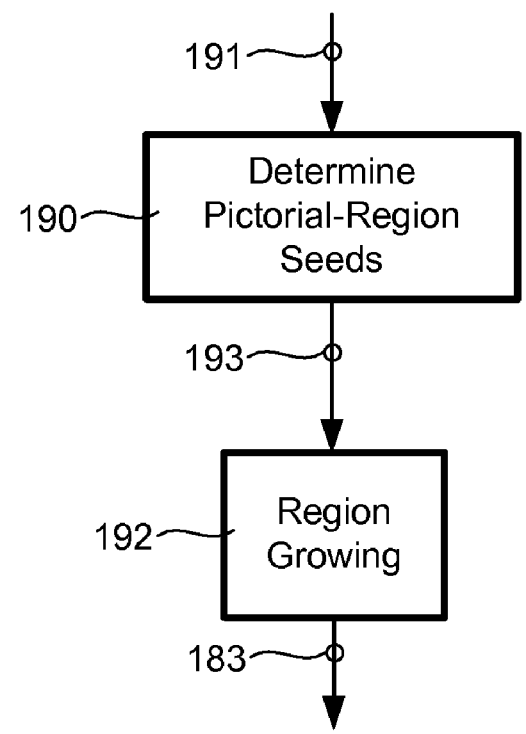
FIG. 19 is a diagram showing exemplary embodiments of the present invention comprising region growing from pictorial-region seeds.

In some embodiments of the present invention, the initial pictorial map 183 may be generated as shown in FIG. 19. In these embodiments, the initial pictorial map 183 may be generated by a region growing process 192. The region growing process 192 may use pictorial-region seeds 193 that may result from pictorial detection 190 based on masked entropy features of the image 191. The pictorial-region seeds 193 may be those pixels in the digital image for which the masked entropy measure 191 may be considered reliable. Those pixels with high masked entropy may be considered pixels for which the masked entropy feature is most reliable. Such pixels may form the seeds 193 used in the region growing 192 of the embodiments of the present invention shown in FIG. 19. A threshold may be used to determine the pictorial-region seeds 193. In some embodiments of the present invention, domain knowledge may be used to determine the threshold. In some embodiments, the pixels with the highest 10 percent of the masked entropy values in the image may be used as pictorial-region seeds 193.

The region growing 192 from the pictorial-region seeds 193 may be controlled by bounding conditions. Pictorial regions may be grown from the high-confidence pictorial-region seeds into the less reliable pictorial-feature response areas. In some embodiments, the pictorial region may be grown until a pixel with a low-confidence level is encountered. In this way, pictorial regions may be grown to include pixels based on their connectivity to those pixels with a strong pictorial-feature response.

In some embodiments, additional information may be used in the region growing process. In some embodiments the additional information may be related to background region identification. A labeled background map indicating background regions may be used in the region growing. In some embodiments, the labeled background map may include, in addition to indices indicating membership in a background region and indexing a background color palette, two reserved labels. One of the reserved labels may represent candidate pictorial pixels as identified by the background color analysis and detection, and the other reserved label may represent pixels with unreliable background color analysis and labeling. In some embodiments, the map label "1" may indicate that a pixel belongs to a candidate pictorial region. The map labels "2" through "254" may indicate background regions, and the map label "255" may represent an unknown or unreliable region.

In some embodiments, the region growing may proceed into regions of low confidence if those regions were labeled as pictorial candidates by the background color analysis and labeling. The pictorial regions may not grow into regions labeled as background. When the growing process encounters a pixel labeled as unknown or unreliable, the growing process my use a more conservative bounding condition or tighter connectivity constraints to grow into the unknown or unreliable pixel. In some embodiments, a more conservative bounding condition may correspond to a higher confidence level threshold. In some embodiments, if a candidate pixel is labeled as a pictorial candidate by the background color analysis, only one neighboring pixel may be required to belong to a pictorial region for the pictorial region to grow to the candidate pixel. If the candidate pixel is labeled as unknown or unreliable by the background color analysis, at least two neighboring pixels may be required to belong to a pictorial region for the pictorial region to grow to the candidate pixel. The neighboring pixels may be the causal neighbors for a particular scan direction, the four or eight nearest neighbors, or any other defined neighborhood of pixels. In some embodiments of the present invention, the connectivity constraint may be adaptive.

Figure 20:
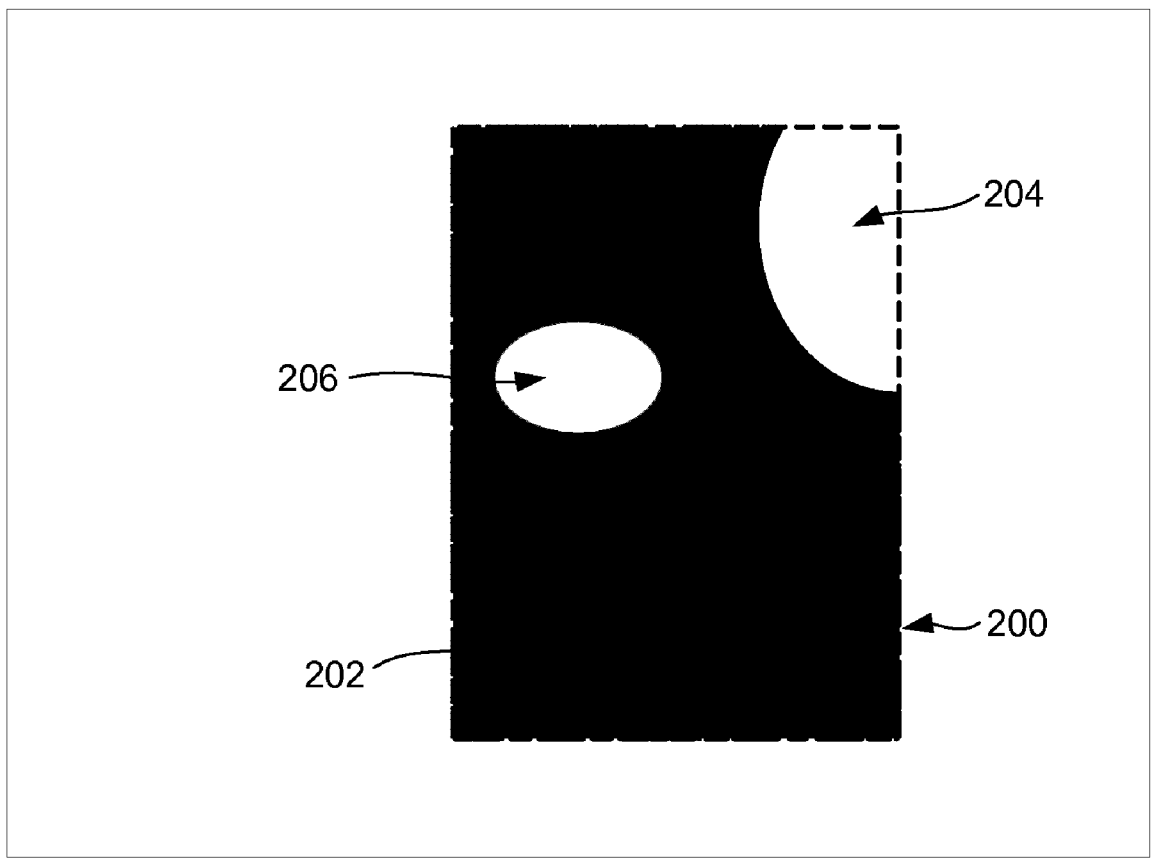
FIG. 20 shows an exemplary pictorial region.

In some embodiments of the present invention, refinement may be performed after initial region growing as described above. FIG. 20 shows an exemplary pictorial region 200 with the results of the region growing 202. Two regions 204, 206 were missed in the initial region growing. Refinement of the initial pictorial map may detect such missed regions. In some embodiments, interior holes in a pictorial region, such as 206 in the exemplary pictorial region shown in FIG. 20, may be detected and labeled as pictorial using any hole-filling method, for example, a flooding algorithm or a connected components algorithm. In some embodiments, concave regions 204 may be filled based on a bounding shape computed for the pictorial region. If a uniform color, or substantially uniform color, surrounds the bounding shape determined for a pictorial region, then concave regions on the boundary of the pictorial region may be labeled as belonging to the pictorial region. A bounding shape may be computed for each region. In some embodiments, the bounding shape may be a rectangle forming a bounding box for the region.

In some embodiments of the present invention, verification of the refined pictorial map may follow. Pictorial map verification may be based on the size of a pictorial region. Small regions identified as pictorial regions may be removed and relabeled. In some embodiments, regions identified as pictorial regions may be eliminated from the pictorial region classification by the verification process based on the shape of the region, the area of the region within a bounding shape, the distribution of the region within a bounding shape, or a document layout criterion. In alternate embodiments, verification may be performed without refinement. In alternate embodiments, hole-filling refinement may be followed by small-region verification which may be subsequently followed by concave-region-filling refinement.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for detecting a region in a digital image, said method comprising:
   a) in a region-detection system, applying a masking condition to a digital image thereby identifying masked pixels that satisfy said masking condition;
   b) in a feature extractor in said region-detection system, calculating an entropy feature associated with a pixel-of-interest in said digital image, wherein said calculating said entropy feature comprises:
      i) quantizing, according to a first quantization, a plurality of pixel values associated with a plurality of pixels in a region surrounding said pixel-of-interest, wherein said plurality of pixels in said region surrounding said pixel-of-interest does not include said masked pixels;
      ii) forming a first histogram of said first-quantization quantized pixel values;
      iii) calculating a first entropy measure for said first histogram;
      iv) quantizing, according to a second quantization, said plurality of pixel values associated with said plurality of pixels in said region surrounding said pixel-of-interest;
      v) forming a second histogram of said second-quantization quantized pixel values; and
      vi) calculating a second entropy measure for said second histogram; and
   c) classifying a neighborhood of said digital image based on a combination of said first entropy measure and said second entropy measure and said pixel-of-interest location.

2. A method as described in claim 1, wherein said first quantization is related to the amount of noise associated with a uniformly colored area in said digital image.

3. A method as described in claim 1 wherein said first histogram bin size comprises a plurality of pixel values.

4. A method as described in claim 1, wherein said first histogram range is smaller than said dynamic range of said first-quantization quantized pixel values.

5. A method as described in claim 1, wherein said calculating said first entropy feature further comprises:
   a) selecting a first lobe of said first histogram; and
   b) calculating said first entropy measure using only said first lobe of said first histogram.

6. A method as described in claim 1 wherein said first histogram bin size is not the same as said second histogram bin size.

7. A method as described in claim 1 wherein said first histogram bins are not located at the same locations as said second histogram bins.

8. A method for detecting a region in a digital image, said method comprising:
   a) in are region-detection system, applying a masking condition to a digital image thereby identifying masked pixels that satisfy said masking condition;
   b) in a feature extractor in said region-detection system, calculating an entropy feature associated with a pixel-of-interest in said digital image, wherein said calculating said entropy feature comprises:
      i) quantizing, according to a first quantization, a plurality of pixel values associated with a plurality of pixels in a region surrounding said pixel-of-interest, wherein said plurality of pixels in said region surrounding said pixel-of-interest does not include said masked pixels;
      ii) forming a first histogram of said first-quantization quantized pixel values; and
      iii) calculating an entropy measure for said first histogram, wherein said calculating said entropy measure for said first histogram comprises:
         (1) selecting a first lobe of said first histogram; and
         (2) calculating said entropy measure using only said first lobe of said first histogram; and
   c) classifying a neighborhood of said digital image based on said entropy measure and said pixel-of-interest location.

9. A method as described in claim 8 wherein said selecting comprises identifying a lobe containing said pixel value of said pixel-of-interest.

10. A system for detecting a region in a digital image, said system comprising:

a) a processor for applying a masking condition to a digital image thereby identifying masked pixels that satisfy said masking condition;
b) a first quantizer for quantizing, according to a first quantization, a plurality of pixel values associated with a plurality of pixels in a region surrounding a pixel-of-interest, wherein said plurality of pixels in said region surrounding said pixel-of-interest does not include said masked pixels;
c) a second quantizer for quantizing, according to a second quantization, said plurality of pixel values associated with said plurality of pixels in said region surrounding said pixel-of-interest;
d) an entropy-feature calculator for calculating an entropy feature associated with said pixel-of-interest in said digital image, said entropy-feature calculator comprising:
   i) a first histogram generator for forming a first histogram of said first-quantization quantized pixel values;
   ii) a first entropy calculator for calculating a first entropy measure for said first histogram;
   iii) a second histogram generator for forming a second histogram of said second-quantization quantized pixel values;
   iv) a second entropy calculator for calculating a second entropy measure for said second histogram; and
   v) a combiner for combining said first entropy measure and said second entropy measure to form a combined entropy measure; and
e) a classifier for classifying a neighborhood of said digital image based on said combined entropy measure and said pixel-of-interest location.

11. A system as described in claim 10, wherein said first quantization is related to the amount of noise associated with a uniformly colored area in said digital image.

12. A system as described in claim 10 wherein said first histogram bin size comprises a plurality of pixel values.

13. A system as described in claim 10, wherein said first histogram range is smaller than said dynamic range of said first-quantization quantized pixel values.

14. A system as described in claim 10, wherein said first entropy calculator further comprises:
   a) a selector for selecting a first lobe of said first histogram; and
   b) a lobe-based calculator for calculating said entropy measure using only said first lobe of said first histogram.

15. A system as described in claim 10 wherein said first histogram bin size is not the same as said second histogram bin size.

16. A system as described in claim 10 wherein said first histogram bins are not located at the same locations as said second histogram bins.

17. A system for detecting a region in a digital image, said system comprising:
   a) a processor for applying a masking condition to a digital image thereby identifying masked pixels that satisfy said masking condition;
   b) a first quantizer for quantizing, according to a first quantization, a plurality of pixel values associated with a plurality of pixels in a region surrounding a pixel-of-interest, wherein said plurality of pixels in said region surrounding said pixel-of-interest does not include said masked pixels;
   c) an entropy-feature calculator for calculating an entropy feature associated with said pixel-of-interest in said digital image, said entropy-feature calculator comprising:
      i) a first histogram generator for forming a first histogram of said first-quantization quantized pixel values; and
      ii) a first entropy calculator for calculating an entropy measure for said first histogram, wherein said first entropy calculator comprises:
         (1) a selector for selecting a first lobe of said first histogram; and
         (2) a lobe-based calculator for calculating said entropy measure using only said first lobe of said first histogram; and
   d) a classifier for classifying a neighborhood of said digital image based on said entropy measure and said pixel of interest.

18. A system as described in claim 17 wherein said selector comprises an identifier for identifying a lobe containing said pixel value of said pixel-of-interest.

19. A method for detecting a region in a digital image, said method comprising:
   a) in a region-detection system, applying a masking condition to a digital image thereby identifying masked pixels that satisfy said masking condition;
   b) in a feature extractor in said region-detection system, calculating an entropy feature associated with a pixel-of-interest in said digital image, wherein said calculating said entropy feature comprises:
      i) forming a plurality of histograms, wherein each histogram in said plurality of histograms is associated with a different quantization, of pixel values for a plurality of pixels in a region surrounding said pixel-of-interest, wherein said masked pixels do not accumulate in said plurality of histograms;
      ii) selecting a first histogram from said plurality of histograms;
      iii) calculating an first entropy measure for said first histogram;
      iv) selecting a second histogram from said plurality of histograms; and
      v) calculating a second entropy measure for said second histogram; and
   c) classifying a neighborhood of said digital image based on a combination of said first entropy measure and said second entropy measure and said pixel-of-interest location.

20. The method of claim 19 wherein said selecting comprises comparing the lobes of said plurality of histograms.

* * * * *